United States Patent
Kissell

(10) Patent No.: US 7,620,832 B2
(45) Date of Patent: *Nov. 17, 2009

(54) METHOD AND APPARATUS FOR MASKING A MICROPROCESSOR EXECUTION SIGNATURE

(75) Inventor: Kevin D. Kissell, Le Bar sur Loup (FR)

(73) Assignee: MIPS Technologies, Inc., Sunnyvale, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 11/257,381

(22) Filed: Oct. 24, 2005

(65) Prior Publication Data

US 2006/0053323 A1    Mar. 9, 2006

Related U.S. Application Data

(63) Continuation of application No. 09/894,812, filed on Jun. 28, 2001, now Pat. No. 6,976,178, which is a continuation-in-part of application No. 09/665,099, filed on Sep. 20, 2000, now Pat. No. 6,625,737.

(51) Int. Cl.
G06F 1/32 (2006.01)
G06F 1/26 (2006.01)

(52) U.S. Cl. ................................ 713/324; 713/320

(58) Field of Classification Search .................. 713/300, 713/320, 323, 324
See application file for complete search history.

(56) References Cited

U.S. PATENT DOCUMENTS

| | | | |
|---|---|---|---|
| 4,023,023 A | 5/1977 | Bourrez et al. |
| 4,085,447 A | 4/1978 | Pertl et al. |
| 4,569,016 A | 2/1986 | Hao et al. |
| 4,908,038 A | 3/1990 | Matsumura et al. |
| 4,928,223 A | 5/1990 | Dao et al. |
| 4,949,250 A | 8/1990 | Bhandarkar et al. |
| 5,181,183 A | 1/1993 | Miyazaki |
| 5,404,402 A | 4/1995 | Sprunk |
| 5,452,401 A | 9/1995 | Lin |
| 5,471,628 A | 11/1995 | Phillips et al. |
| 5,499,299 A | 3/1996 | Takenaka et al. |

(Continued)

OTHER PUBLICATIONS

U.S. Appl. No. 60/294,598, Stribaek et al.

(Continued)

*Primary Examiner*—Chun Cao
(74) *Attorney, Agent, or Firm*—Sterne, Kessler, Goldstein & Fox P.L.L.C.

(57) ABSTRACT

An apparatus and method are provided that disassociates the power consumed by a processing system from the instructions that it executes. The apparatus includes a power predictor that predicts the power that will be consumed by the processing system during execution of particular instructions, and a subsystem inhibition control, that selectively turns on/off available subsystems within the processing system based on the power that is predicted to be consumed. By predicting the power that will be consumed during execution, and by selectively turning on/off particular subsystems, the total power consumed by the processing system can be made invariant, or random. In either case, a counterweight current can be added to the processing system, depending on which of the subsystems are available to be turned on/off, and which are turned on/off, to further disassociate the total power consumed by the processing system from the instructions it is executing.

26 Claims, 9 Drawing Sheets

U.S. PATENT DOCUMENTS

| | | | |
|---|---|---|---|
| 5,664,017 A | 9/1997 | Gressel et al. | |
| 5,673,407 A | 9/1997 | Poland et al. | |
| 5,696,937 A | 12/1997 | White et al. | |
| 5,729,554 A | 3/1998 | Weir et al. | |
| 5,748,979 A | 5/1998 | Trimberger | |
| 5,761,523 A | 6/1998 | Wilkinson et al. | |
| 5,768,172 A | 6/1998 | Derby | |
| 5,778,074 A | 7/1998 | Garcken et al. | |
| 5,781,457 A | 7/1998 | Cohen et al. | |
| 5,812,669 A | 9/1998 | Jenkins et al. | |
| 5,819,117 A | 10/1998 | Hansen | |
| 5,838,795 A | 11/1998 | Mittenthal | |
| 5,838,986 A | 11/1998 | Garg et al. | |
| 5,842,027 A | 11/1998 | Oprescu et al. | |
| 5,850,452 A | 12/1998 | Sourgen et al. | |
| 5,941,991 A | 8/1999 | Kageshima | |
| 6,009,450 A | 12/1999 | Dworkin et al. | |
| 6,035,317 A | 3/2000 | Guy | |
| 6,041,122 A | 3/2000 | Graunke et al. | |
| 6,041,403 A | 3/2000 | Parker et al. | |
| 6,049,613 A | 4/2000 | Jakobsson | |
| 6,055,640 A | 4/2000 | Kageshima et al. | |
| 6,064,740 A | 5/2000 | Curiger et al. | |
| 6,067,615 A | 5/2000 | Upton | |
| 6,069,954 A | 5/2000 | Moreau | |
| 6,075,974 A | 6/2000 | Saints et al. | |
| 6,138,229 A | 10/2000 | Kucukcakar et al. | |
| 6,141,421 A | 10/2000 | Takaragi et al. | |
| 6,141,786 A | 10/2000 | Cox et al. | |
| 6,145,077 A | 11/2000 | Sidwell et al. | |
| 6,154,834 A | 11/2000 | Neal et al. | |
| 6,167,524 A | 12/2000 | Goodnow et al. | |
| 6,172,494 B1 | 1/2001 | Feuser | |
| 6,173,408 B1 | 1/2001 | Jimbo et al. | |
| 6,199,087 B1 | 3/2001 | Blake et al. | |
| 6,199,088 B1 | 3/2001 | Weng et al. | |
| 6,205,555 B1 | 3/2001 | Kageshima et al. | |
| 6,219,796 B1 | 4/2001 | Bartley | |
| 6,256,743 B1 | 7/2001 | Lin | |
| 6,278,783 B1 | 8/2001 | Kocher et al. | |
| 6,279,023 B1 | 8/2001 | Weng et al. | |
| 6,295,599 B1 | 9/2001 | Hansen et al. | |
| 6,298,438 B1 | 10/2001 | Thayer et al. | |
| 6,304,658 B1 | 10/2001 | Kocher et al. | |
| 6,327,661 B1 | 12/2001 | Kocher et al. | |
| 6,345,362 B1 | 2/2002 | Bertin et al. | |
| 6,374,085 B1 | 4/2002 | Saints et al. | |
| 6,381,690 B1 | 4/2002 | Lee | |
| 6,430,684 B1 | 8/2002 | Bosshart | |
| 6,480,869 B1 | 11/2002 | Fujioka | |
| 6,510,518 B1 | 1/2003 | Jaffe et al. | |
| 6,535,988 B1 * | 3/2003 | Poisner | 713/500 |
| 6,564,328 B1 | 5/2003 | Grochowski et al. | |
| 6,584,571 B1 | 6/2003 | Fung | |
| 6,594,771 B1 | 7/2003 | Koerber et al. | |
| 6,615,366 B1 | 9/2003 | Grochowski et al. | |
| 6,618,804 B1 | 9/2003 | Steele, Jr. et al. | |
| 6,618,811 B1 | 9/2003 | Berthaud et al. | |
| 6,625,736 B1 | 9/2003 | Berthaud et al. | |
| 6,625,737 B1 | 9/2003 | Kissell | |
| 6,625,740 B1 | 9/2003 | Datar et al. | |
| 6,651,176 B1 | 11/2003 | Soltis et al. | |
| 6,654,884 B2 | 11/2003 | Jaffe et al. | |
| 6,715,066 B1 | 3/2004 | Steele, Jr. | |
| 6,952,478 B2 | 10/2005 | Lee et al. | |
| 6,976,178 B1 | 12/2005 | Kissell | |
| 7,318,145 B1 | 1/2008 | Stribaek et al. | |
| 2003/0172254 A1 | 9/2003 | Mandavilli et al. | |
| 2004/0025032 A1 | 2/2004 | Chow et al. | |

OTHER PUBLICATIONS

U.S. Appl. No. 10/141,579, Stribaek et al.

Christophe Clavier et al., "Differential Power Analysis in the Presence of Hardware Countermeasures," *CHES 2000, LNCS 1965*, pp. 252-263 (2000).

Shi, Z., and Lee, R.B., "Bit Permutation Instructions for Accelerating Software Cryptography," *Proceedings of the IEEE International Conference on Application-specific Systems, Architectures and Processors*, pp. 138-148, Boston, MA (Jul. 10-12, 2000).

Marketing literature from Philips Semiconductors, "On the Move - Philips Semiconductors and IBM Research to Co-develop Secure Smart Cards" [online]. Feb. 1999, Document order No. 9397.750. 05157, [Retrieved on Feb. 1, 2006]. Retrieved from the Internet: <URL: http://www.semiconductors.philips.com/acrobat_download/literature/9397/75005157.pdf>.

Philips Semiconductors Short Form Specification, "P16WX064 SmartXA-Family, Secure 16-bit Smart Card Controller," Revision 1.1 [online]. Feb. 2001, pp. 1-11 [Retrieved on Feb. 1, 2006]. Retrieved from the Internet: <URL: http://www.semiconductors.philips.com/acrobat_download/other/identification/sfs052411.pdf>.

Certification Report BSI-DSZ-CC-0203-2003 for Philips Smart Controller P16WX064V0C [online]. Philips Semiconductors GmbH [Retrieved on Feb. 1, 2006]. Retrieved from the Internet: <URL: http://www.bsi.bund.de//zertifiz/zert/reporte/0203a.pdf>.

"Security Target BSI-DSZ-CC-0203, Version 1.1, Jan. 24, 2003, Evaluation of the Philips P16WX064V0C Secure 16-bit Smart Card Controller" [online]. Philips Semiconductors GmbH, pp. 1-74 [Retrieved on Feb. 1, 2006]. Retrieved from the Internet: <URL: http://www.commoncriteriaportal.org/public/files/epfiles/0203b.pdf>.

Jean-Francois Dhem and Nathalie Feyt, "Hardware and Software Symbiosis Helps Smart Card Evolution" [online]. IEEE Micro, Nov.-Dec. 2001, pp. 14-25 [Retrieved on Feb. 1, 2006]. Retrieved from the Internet: <URL:http://www.it.iitb.ac.in/~satish/Thesis%20Report%20New%201/2_Review%20of%20literature/2_reference/2_29_Hardware%20and%20software%20symbiosis%20helps%20smart%20card%20evolutic Jean-Francois Dhem and Nathalie Feyt, "Present and Future Smart Cards" [online]. Gemplus - Card Security Group, pp. 1-9 [Retrieved on Feb. 1, 2006]. Retrieved from the Internet <URL:http://www.it-c.dk/courses/DSK/F2003/smart2.pdf>.

Kutler, Jeffrey, *Smart Cards: Even Abundant Security Features Don't Spur Smart Card Buy-In*, American Banker, vol. 163, No. 221, Nov. 18, 1998, available in Am. Banker 11998 WL 13326041.

*STMicroelectronics And Gemplus Announce Smart Card Security Certification Including Hardware And Software*, EDP Weekly's IT Monitor, vol. 42, Issue 13, Apr. 2, 2001, available in EDP Wkly. 42001 WL 14018034.

*Can Silicon Stop The Smartcard Hackers?*, Electronics Times, Feb. 15, 1999, available in Electronics Times 321999 WL 9348105.

*STMicroelectronics And Gemplus Announce Smart Card Security Certification Including Hardware And Software*, Business Wire, Mar. 29, 2001, available in WESTLAW, Mar. 29, 2001 Bus. Wire 02:05:00.

Vollmer, Alfred, *Security ICs Are Targeting Consumer Applications*, Electronic Design, vol. 48, Issue 23, Nov. 6, 2000, available in Electronic Design 1052000 WL 14003957.

Coron, J.-S. and Goubin, L., "On Boolean and Arithmetic Masking Against Differential Power Analysis," in *Proceedings of Second International Workshop on Cryptographic Hardware and Embedded Systems, CHES 2000* (Eds., C.K. Koç and C. Paar), Worcester, Massachusetts, USA, Aug. 17-18, 2000, pp. 231-237, Springer-Verlag, Berlin/Heidelberg, Germany (2000).

Hasan, M. Anwar, "Power Analysis Attacks and Algorithmic Approaches to their Countermeasures for Koblitz Curve Cryptosystems," in *Proceedings of Second International Workshop on Cryptographic Hardware and Embedded Systems, CHES 2000*

(Eds., C.K. Koç and C. Paar), Worcester, Massachusetts, USA, Aug. 17-18, 2000, pp. 93-108, Springer-Verlag, Berlin/Heidelberg, Germany (2000).

Kato, T. et al., "A Design for Modular Exponentiation Coprocessor in Mobile Telecommunication Terminals," in *Proceedings of Second International Workshop on Cryptographic Hardware and Embedded Systems, CHES 2000* (Eds., C.K. Koç and C. Paar), Worcester, Massachusetts, USA, Aug. 17-18, 2000, pp. 216-228, Springer-Verlag, Berlin/Heidelberg, Germany (2000).

Myer-Sommer, R., "Smartly Analyzing the Simplicity and the Power of Simple Power Analysis on Smartcards," in *Proceedings of Second International Workshop on Cryptographic Hardware and Embedded Systems, CHES 2000* (Eds., C.K. Koç and C. Paar), Worcester, Massachusetts, USA, Aug. 17-18, 2000, pp. 78-92, Springer-Verlag, Berlin/Heidelberg, Germany (2000).

Naccache, D. And Tunstall, M., "How to Explain Side-Channel Leakage to your Kids," in *Proceedings of Second International Workshop on Cryptographic Hardware and Embedded Systems, CHES 2000* (Eds., C.K. Koç and C. Paar), Worcester, Massachusetts, USA, Aug. 17-18, 2000, pp. 229-230, Springer-Verlag, Berlin/Heidelberg, Germany (2000).

Shamir, A., "Protecting Smart Cards from Passive Power Analysis with Detached Power Supplies," in *Proceedings of Second International Workshop on Cryptographic Hardware and Embedded Systems, CHES 2000* (Eds., C.K. Koç and C. Paar), Worcester, Massachusetts, USA, Aug. 17-18, 2000, pp. 71-77, Springer-Verlag, Berlin/Heidelberg, Germany (2000).

Weingart, S.H., "Physical Security Devices for Computer Subsystems: A Survey of Attacks and Defenses," in *Proceedings of Second International Workshop on Cryptographic Hardware and Embedded Systems, CHES 2000* (Eds., C.K. Koç and C. Paar), Worcester, Massachusetts, USA, Aug. 17-18, 2000, pp. 302-317, Springer-Verlag, Berlin/Heidelberg, Germany (2000).

Kocher, P. et al., "Differential Power Analysis," in *Advances in Cryptology - Proceedings of 19th Annual International Cryptology Conference, Crypto '99* (Ed. Michael J. Wiener), Santa Barbara, California, USA, Aug. 15-19, 1999, Springer-Verlag, Berlin/Heidelberg, Germany (1999) 10 pages.

Daemen, J. et al., "Bitslice Ciphers and Power Analysis Attacks," presented at *Fast Software Encryption Workshop 2000*, New York, New York, USA, Apr. 10-12, 2000 (16 pages).

Jae Wook Chung et al., "Fast Implementation of Elliptic Curve Defined over Gf($p^m$) on CalmRISC with MAC2424 Coprocessor," C.K. Koc and C. Paar (Eds.): CHES 2000, LNCS 1965, pp. 57-70, 2000 (11 pages).

Darrel Hankerson et al., "Software Implementation of Elliptic Curve Cryptography over Binary Fields," C.K. Koc and C. Paar (Eds.): CHES 2000, LNCS 1965, pp. 1-24, 2000 (24 pages).

Marc Joye et al., "Efficient Generation of Prime Numbers," C.K. Koc and C. Paar (Eds.): CHES 2000, LNCS 1965, pp. 340-354, 2000 (15 pages).

Souichi Okada et al., "Implementation of Elliptic Curve Cryptographic Coprocessor over GF($2^m$) on an FPGA," C.K. Koc and C. Paar (Eds.): CHES 2000, LNCS 1965, pp. 25-40, 2000 (16 pages).

Geraldo Orlando et al.," A High-Performance Reconfigurable Elliptic Curve Processor for GF($2^m$)," C.K. Koc and C. Paar (Eds.): CHES 2000, LNCS 1965, pp. 41-56, 2000 (16 pages).

Erkay Savas et al., "A Scalable and Unified Multiplier Architecture for Finite Fields GF(p) and Gf($2^m$)," C.K. Koc and C. Paar (Eds.): CHES 2000, LNCS 1965, pp. 277-282 and 284-292, 2000 (15 pages).

Shi, Z., and Lee, R.B., "Bit Permutation Instructions for Accelerating Software Cryptography," *Proceedings of the IEEE International Conference on Application-specific Systems, Architectures and Processors*, pp. 138-148, Boston, MA, USA, Jul. 10-12, 2000 (11 pages).

Koç, C.K., and Acar, T., "Montgomery Multiplication in Gf (2k)," *Proceedings of Third Annual Workshop on Selected Areas in Cryptography*, pp. 95-106, Queens University, Kingston, Ontario, Canada, Aug. 15-16, 1996 (13 pages).

IBM Technical Disclosure Bulletin, "Pipelined Hardware Multiplier with Extended Precision," vol. 23, Issue 9, pp. 4322-4323, Feb. 1, 1981 (5 pages).

*A236 Parallel Digital Signal Processor Chip Programmer's Reference Manual*, Oxford Micro Devices, Inc., 1994, 195 pages (Bates Nos. L11184-L11378).

*DSP56000 24-Bit Digital Signal Processor Family Manual*, Motorola, Inc., 1995, 638 pages (Bates Nos. L08722-L09359).

Lijun Gao, Sarvesh Shrivastava, Hanbo Lee, Gerald E. Sobelman, "A Compact Fast Variable Key Size Elliptic Curve Cryptosystem Coprocessor," *Proceedings of the 7th Annual IEEE Symposium on Field-Programmable Custom Computing Machines*, Apr. 21-23, 1999, pp. 304-305 (4 pages).

*i860™ Microprocessor Family Programmer's Reference Manual*, Intel Corporation, 1992, 79 pages (Bates Nos. L09361-L09439).

*IEEE Standard for Binary Floating-Point Arithmetic*, IEEE, 1985, pp. i-vi and 1-14.

Koc, C.K., and Acar, T., "Fast Software Exponentiation in GF($2^k$)," *Proceedings of the 13th IEEE Symposium on Computer Arithmetic*, IEEE, Jul. 6-9, 1997, pp. 225-231 (9 pages).

*TMS320C1x/C2x/C2xx/C5x Assembly Language Tools User's Guide*, Texas Instruments, Mar. 1995, 483 pages (Bates Nos. L07916-L08398).

*TMS320C5x General-Purpose Applications User's Guide*, Texas Instruments, Jul. 1997, 167 pages (Bates Nos. L08399-L08565).

*VIS™ Instruction Set User's Manual*, Sun Microsystems, Inc., 1997, pp. i-xii and 1-136.

Patent Abstracts of Japan, Publication No. JP11203106 (Jul. 30, 1999), English Language Abstract for JP Patent Application No. JP19980005096 (Jan. 13, 1998).

Patent Abstracts of Japan, Publication No. JP4142618 (May 15, 1992), English Language Abstract for JP Patent Application No. JP19900264991 (Oct. 4, 1990).

Patent Abstracts of Japan, Publication No. JP61223938 (Oct. 4, 1986), English Language Abstract for JP Patent Application No. JP 19850063782 (Mar. 29, 1985).

Patent Abstracts of Japan, Publication No. JP8314717 (Nov. 29, 1996), English Language Abstract for JP Patent Application No. JP19960146619 (May 16, 1996).

Patent Abstracts of Japan, Publication No. JP2003533829T (Nov. 11, 2003), English Language Abstract for JP Patent Application No. JP20010585439T (May 7, 2001).

Redacted R21 Informal Technical Report, R21-TECH-30-95, titled "CAPSTONE (MYK-80) Specifications (U)", Reportedly obtained from the National Security Agency by FOIA request (Aug. 14, 1995) 27 pages.

MYK-78 Clipper Chip Encryption/Decryption on a Chip; (1993) 3 pages.

Ross Anderson et al. "Tamper Resistance - a Cautionary Note", USENIX Association in *The Second USENIX Workshop on Electronic Commerce Proceedings*, Oakland, CA, Nov. 18-21, 1996, 11 pages.

Earnest F. Brickell, et al. "Skipjack Review, Interim Report, The SkipJack Algorithm"; Amperif Corporation, Jul. 28, 1993, 60 pages.

Paul Kocher, et al. "Differential Power Analysis", Cryptography Research Inc., (1999) 10 pages.

Office Communication, dated Oct. 6, 2004, for U.S. Appl. No. 10/141,579, filed May 9, 2002, 12 pages.

Office Communication, dated Apr. 15, 2005, for U.S. Appl. No. 10/141,579, filed May 9, 2002, 14 pages.

Office Communication, dated Jul. 17, 2006, for U.S. Appl. No. 10/141,579, filed May 9, 2002, 5 pages.

Office Communication, dated Jan. 12, 2007, for U.S. Appl. No. 10/141,579, filed May 9, 2002, 6 pages.

* cited by examiner

| R | A | M | W | Total |
|---|---|---|---|---|
| $I_4$=5 | $I_3$=20 | $I_2$=30 | $I_1$=10 | 65 |
| $I_5$=10 | $I_4$=20 | $I_3$=20 | $I_2$=20 | 70 |
| $I_6$=5 | $I_5$=15 | $I_4$=15 | $I_3$=10 | 45 |
| $I_7$=10 | $I_6$=20 | $I_5$=20 | $I_4$=10 | 60 |
| $I_8$=15 | $I_7$=20 | $I_6$=30 | $I_5$=15 | 80 | per stage counterweight (i)

METHOD AND APPARATUS FOR MASKING A MICROPROCESSOR EXECUTION SIGNATURE

CROSS REFERENCE TO RELATED APPLICATION(S)

This application is a continuation of U.S. patent application Ser. No. 09/894,812, filed Jun. 28, 2001 now U.S. Pat. No. 6,976,178, entitled "A METHOD AND APPARATUS FOR DISASSOCIATING POWER CONSUMED WITHIN A PROCESSING SYSTEM WITH INSTRUCTIONS IT IS EXECUTING", which is a continuation-in-part of U.S. patent application Ser. No. 09/665,099 filed Sep. 20, 2000, now U.S. Pat. No. 6,625,737, entitled "SYSTEM FOR PREDICTION AND CONTROL OF POWER CONSUMPTION IN DIGITAL SYSTEMS", both commonly assigned to MIPS Technologies, Inc.

BACKGROUND OF THE INVENTION

1. Field of the Invention

This invention relates in general to the field of instruction processing in computer systems, and more particularly to an apparatus and method in a CPU for predicting power consumption for executing instructions and counterbalancing or randomizing total power consumption for security purposes by turning on or shutting down selected subsystems.

2. Description of the Related Art

Early computers processed instructions, one at a time, with the instructions appearing on a data/address bus. The data/address bus was electrically visible to a test engineer such that probes could be directly attached to the bus, and the bus could be monitored to determine what instructions were executing. In fact, in embedded system design, it was common for a developer to utilize a test device, such as a state analyzer, to help test and debug his program.

For example, a developer would connect a state analyzer to the data/address bus of his computer, load his program into the memory of the computer, and then reset the computer so that it would begin processing his instructions. The state analyzer would record the instructions being executed on a clock-by-clock basis. The developer could examine the instructions recorded by the state analyzer, and could determine whether his program was executing as planned. In a similar manner, someone wanting to discover what program was operating on a computer could connect a state analyzer to the data/address bus, and could capture the program as it executed (i.e. reverse engineer the code).

With the advent of the microprocessor, testing of program code, and reverse engineering of program code, became more difficult. Early microprocessors utilized address and data buses to obtain their instructions and data from external memory such as ROM's and RAM's. Thus, a state analyzer could be coupled to the address and data buses of a microprocessor to capture the values appearing on the buses on a clock-by-clock basis. Software programs, called disassemblers, were then used to interpret the values appearing on the address and data buses, and convert them into the actual instructions that were being executed by the microprocessor. Thus, state analyzers, along with disassemblers, were used both by software developers for debugging, and by those interested in discovering what someone else had programmed.

As the complexity of microprocessors increased, so did the difficulty of testing (or reverse engineering) the instructions they were executing. For example, modern processors, although they have external data and address buses, cannot successfully be probed to determine what instructions are executing. This is because the values appearing on the address and data buses seldom relate to what the processor is doing at any one time.

More specifically, within a modern microprocessor are large areas of memory (or cache) for both data and instructions. When a processor needs data or instructions that are not already resident within the processor, the processor will request the data/instructions from external memory. It is common, however, for blocks of data/instructions, in addition to those particularly requested, to be transferred back to the processor. So, examination of the external data/address buses during the transfer does not provide any direct correlation to the instructions that are executing. In addition, as is most often the case, the data and instructions that are executing are already resident within internal cache. So, as they execute, there is no activity on the external address/data buses that provide any indication as to what is being executed.

Furthermore, most modern processors are capable of executing multiple instructions at the same time, using a technology referred to as "pipelining". Although pipelining is beyond the scope of the present discussion, it suffices to say that pipelining in a microprocessor is similar to an assembly line, where an instruction proceeds thru several stages within a processor, each stage performing a certain operation. The instruction is preceded and followed by other instructions, in preceding and following stages in the pipeline. Thus, at any one time, a pipelined microprocessor is executing as many different instructions as there are stages in the pipeline (e.g., a 5 stage pipeline may be executing 5 different instructions).

So, since there is no longer a direct correlation between what appears on the data/address buses of a processor, and the instructions it is executing, and because multiple instructions are typically executing simultaneously, other methodologies have been developed for both software test, and reverse engineering. For software test, a common approach is the use of a simulator. The simulator utilizes a software model of the internal architecture of a processor (such as a VHDL model) to execute a particular program. A trace output from the simulator provides an indication to a developer of how his program should function within a fabricated processor. The simulator is a great tool for the developer, because s/he has access to the internal model of the processor.

The reverse engineer, however, has no access to the internal model of a processor that s/he is trying to decode. Such an internal model is highly proprietary, and closely guarded by the developer. But the reverse engineer has not been thwarted. Rather, a sophisticated science, referred to as "differential power analysis" (DPA), has been developed to speculate or determine the instruction flow within a processor.

In general, certain estimates can be made about the size and thus the power requirements of particular functional blocks (cache, ALU, Register, etc.) of a modern processor. Using these estimates, the total power consumed by a microprocessor can be monitored on a clock-by-clock basis, while the microprocessor is executing instructions. Analysis of the power consumed by the microprocessor, in conjunction with speculated power requirements associated with each of the instructions in the processor's instruction set, can often allow a reverse engineer to accurately speculate or determine the instructions being executed by a processor.

In many cases, such reverse engineering can have devastating consequences. For example, one modern application of a microprocessor is within a smart card. The smart card is much like a credit card. However, it contains a microprocessor that stores confidential information such as a person's bank account number, balance, medical history, social security number, etc. Thus, the developer of a smart card is very interested in preventing the information within the processor from being discovered. Differential power analysis applied to reverse engineer the processor can allow such confidential to be discovered, and utilized, to the detriment of the cardholder.

In view of the above, what is needed is an apparatus that may be used within a microprocessor, to prevent the reverse engineering of the program that is executing on the processor.

More specifically, what is needed is a power management apparatus that can disassociate the power that is consumed by a microprocessor, during instruction execution, from the actual power requirements of those instructions. Such an apparatus, in disassociating the power consumed by the microprocessor, from the instructions it is executing, would thwart a reverse engineer's attempt to discover confidential information using differential power analysis.

Moreover, what is needed is a power management apparatus that turns on or shuts down certain subsystems within the microprocessor, or subsystems that are external to but associated with the microprocessor (i.e., such as a system on a chip), for the purpose of disassociating the instantaneous power drain of the microprocessor from the instructions it is executing.

SUMMARY

For the foregoing reasons, there is a need for an apparatus and method that disassociates the power consumption of a microprocessor based system from the instructions that it is executing.

To address the above-detailed deficiencies, it is an object of the present invention to provide a security system for a microprocessor having multiple subsystems to insure that the power consumption of the microprocessor is not indicative of the instructions that it is executing. The security system includes a power correlator and subsystem inhibition control. The power correlator estimates the power that the microprocessor will consume during execution of instructions. The subsystem inhibition control, utilizes the estimated power, and selectively turns on/off ones of the multiple subsystems within the microprocessor during execution of the instructions. The ones of the multiple subsystems that are turned on/off are selected so as to disassociate the total power consumed by the microprocessor from the instructions it is executing.

In yet another aspect, the present invention provides an apparatus within a processing system having multiple subsystems for randomizing the total power consumed within the processing system. The apparatus includes a random value generator, and subsystem inhibition control. The random value generator generates a random value as instructions are executed by the processing system. The subsystem inhibition control turns on/off selected ones of the multiple subsystems in response to the generated random value. By turning on/off selected ones of the subsystems, the subsystem inhibition control disassociates instructions that are executed from power consumed by the processing system during their execution.

In a further aspect, the present invention provides a computer program product for use with a computing system. The computer program product includes a computer usable medium, having computer readable program code embodied in said medium, for causing a processing system having multiple subsystems to be described. The computer readable program code includes: first program code for providing a power prediction system for providing a predictor of estimated power that will be consumed during execution of instructions by the processing system; and second program code for providing a subsystem inhibition control, coupled to said power prediction system, for receiving said predictor, and for turning on/off selected ones of the subsystems based on the value of said predictor.

Yet a further aspect of the invention provides a method for disassociating the power that is consumed by a microprocessor having multiple subsystems, from the instructions that it is executing. The method includes: estimating the power that will be consumed by each instruction in the microprocessor; and selectively turning on/off ones of the multiple subsystems such that the total power consumed by the microprocessor is unrelated to the instructions that are executing.

In a further aspect, the present invention provides a computer data signal embodied in a transmission medium including computer-readable first program code for providing a power correlator that estimates the power that will be consumed as an instruction executes on a microprocessor having multiple subsystems; and computer-readable second program code for providing subsystem inhibition control, for utilizing the estimated power, and for selectively turning on/off ones of the multiple subsystems within the microprocessor during execution of the instructions.

BRIEF DESCRIPTION OF THE DRAWINGS

These and other objects, features, and advantages of the present invention will become better understood with regard to the following description, and accompanying drawings where.

DETAILED DESCRIPTION

Figure 1:
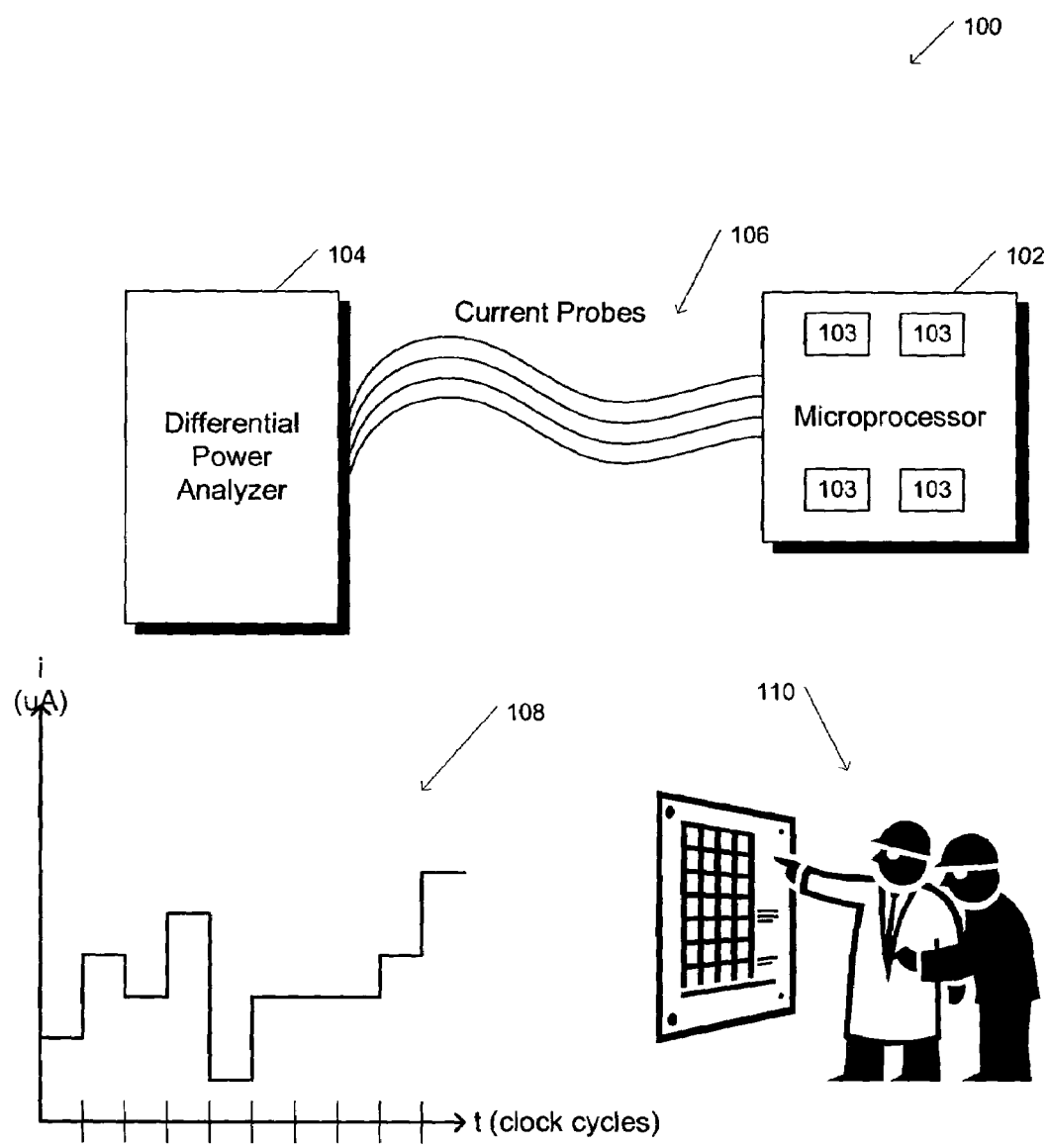
FIG. 1 is a prior art diagram illustrating the use of differential power analysis to determine instruction flow in a microprocessor.

Referring to FIG. 1, a block diagram of a microprocessor based system 100 is shown to illustrate a prior art method of determining what instructions are executing on a microprocessor. The method utilizes a technology referred to as differential power analysis. More specifically, a microprocessor 102 is shown attached to a differential power analyzer 104 via current probes 106. In most instances, the differential power analyzer 104 is a current monitor that is capable of measuring current drain on selected pins of the microprocessor 102, on a continuous basis. Since the voltage is constant, power consumed by the microprocessor 102 may be determined by measuring the current drawn on each of its power supply pins. A graph 108 is shown illustrating the cumulative current (measured along the y-axis) drawn by the microprocessor 102 during consecutive clock cycles (measured along the x-axis). Also shown are two scientists 110 examining the chart 108 to try to understand what the microprocessor is doing during each clock cycle.

For example, it is possible to characterize functional blocks 103 within a microprocessor 102, such as floating point units, integer Arithmetic Logic Units (ALU's), cache memory systems, etc., in terms of how much power is required for the units to perform a task during a clock cycle. Once such a characterization is done (or estimated), measurement of current consumed by the microprocessor 102 can allow fairly accurate speculation, if not determination, of exactly which instructions are executing on the microprocessor 102, even though the scientists 110 do not have access to programmed instructions, as written, or to the internal buses of the microprocessor 102. And, by determining what the instructions are that are executing on the microprocessor 102, security features of the microprocessor based system 100, may be broken.

Figure 2:
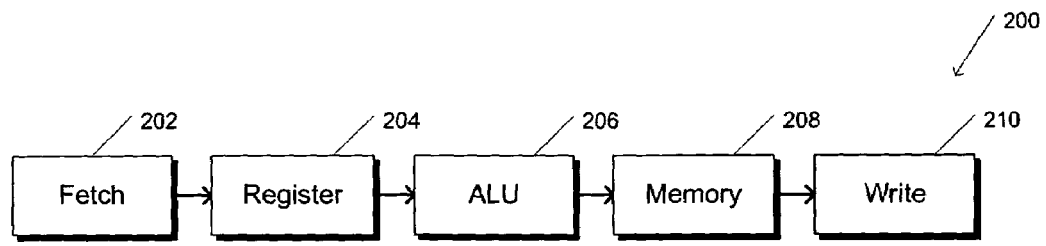
FIG. 2 is a prior art block diagram illustrating power variation per clock cycle of a sequence of executing instructions in a pipeline microprocessor.
Figure 2:
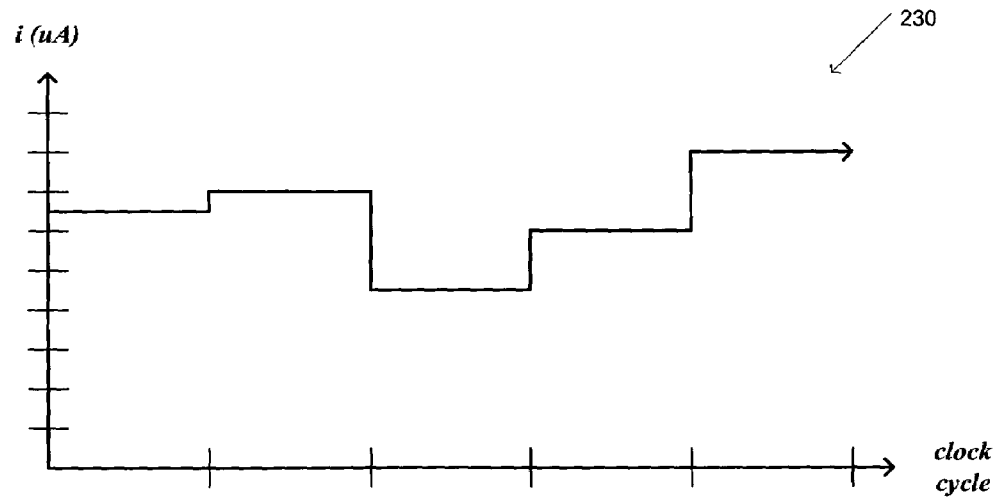

Referring now to FIG. 2, a prior art block diagram 200 is shown to particularly illustrate the effect of different instructions, or instruction types, on the power consumption of a pipelined microprocessor. More specifically, a 5-stage microprocessor 200 is shown. The stages include: Fetch 202, Register 204, ALU 206, Memory 208 and Write 210. The Fetch stage 202 utilizes a program counter (not shown) to fetch instructions to be executed by the processor 200. Once fetched, the instructions are provided to the Register stage 204. The Register stage 204 decodes the instructions, and if necessary, retrieves the contents of specified operands and provides them to the ALU stage 206. The ALU stage 206 either performs arithmetic on the operands, or calculates addresses, for load/store instructions. Instruction flow then proceeds to the Memory stage 208. The memory stage 208 is typically associated with cache access for load/store operations. Instruction flow then proceeds to the Write stage 210 where the result of ALU operations, or data retrieved from the cache, are written back to the register file or memory (not shown).

For exemplary purposes, a table 220 is provided to illustrate the progression of eight instructions ($I_1$-$I_8$) through the pipeline stages 204-210 of the processor 200. One skilled in the art will appreciate that the current values associated with each of the instructions is illustrative only, and no meaning should be attached to the specific values shown.

During a first clock cycle, instruction $I_1$ is in the W stage 210, instruction $I_2$ is in the M stage 208, instruction $I_3$ is in the A stage 206, and instruction $I_4$ is in the R stage 204. As shown, each of the instructions $I_1$ thru $I_4$ consumes different amounts of power (5-30) depending on what function they are performing, and depending on which pipeline stage they are in. In this illustration, their combined current consumption is 65.

During a second clock cycle, instruction $I_1$ falls out of the pipeline, instructions $I_2$-$I_4$ proceed to the next pipeline stage, and instruction $I_5$ enters the R stage 204. At this point, two things should be understood. First, instructions typically proceed sequentially from the R stage 204, thru to the W stage 210. Second, the amount of current consumed by a particular instruction is not constant through each of the stages. Rather, the current consumed by a particular instruction will often vary from stage to stage, with the amount in each stage determined by the type of instruction executing. In the second clock cycle, the combined current consumption is shown to be 70.

During a third clock cycle, instruction $I_2$ falls out of the pipeline, instructions $I_3$-$I_5$ proceed to the next pipeline stage, and instruction $I_6$ enters the R stage 204. In the third clock cycle, the combined current consumption is shown to be 45.

During a fourth clock cycle, instruction $I_3$ falls out of the pipeline, instructions $I_4$-$I_6$ proceed to the next pipeline stage, and instruction $I_7$ enters the R stage 204. In the fourth clock cycle, the combined current consumption is shown to be 60.

During a fifth clock cycle, instruction $I_4$ falls out of the pipeline, instructions $I_5$-$I_7$ proceed to the next pipeline stage, and instruction $I_8$ enters the R stage 204. In the fifth clock cycle, the combined current consumption is shown to be 80.

The above is particularly illustrated by reference to chart 230 that graphically depicts the total current consumption of the processor 200 during clock cycles 1-5. It is information such as that shown within the chart 230 that is often used to break the security of a microprocessor 200, by determining what instructions are executing on it, on a clock-by-clock basis.

Figure 3:
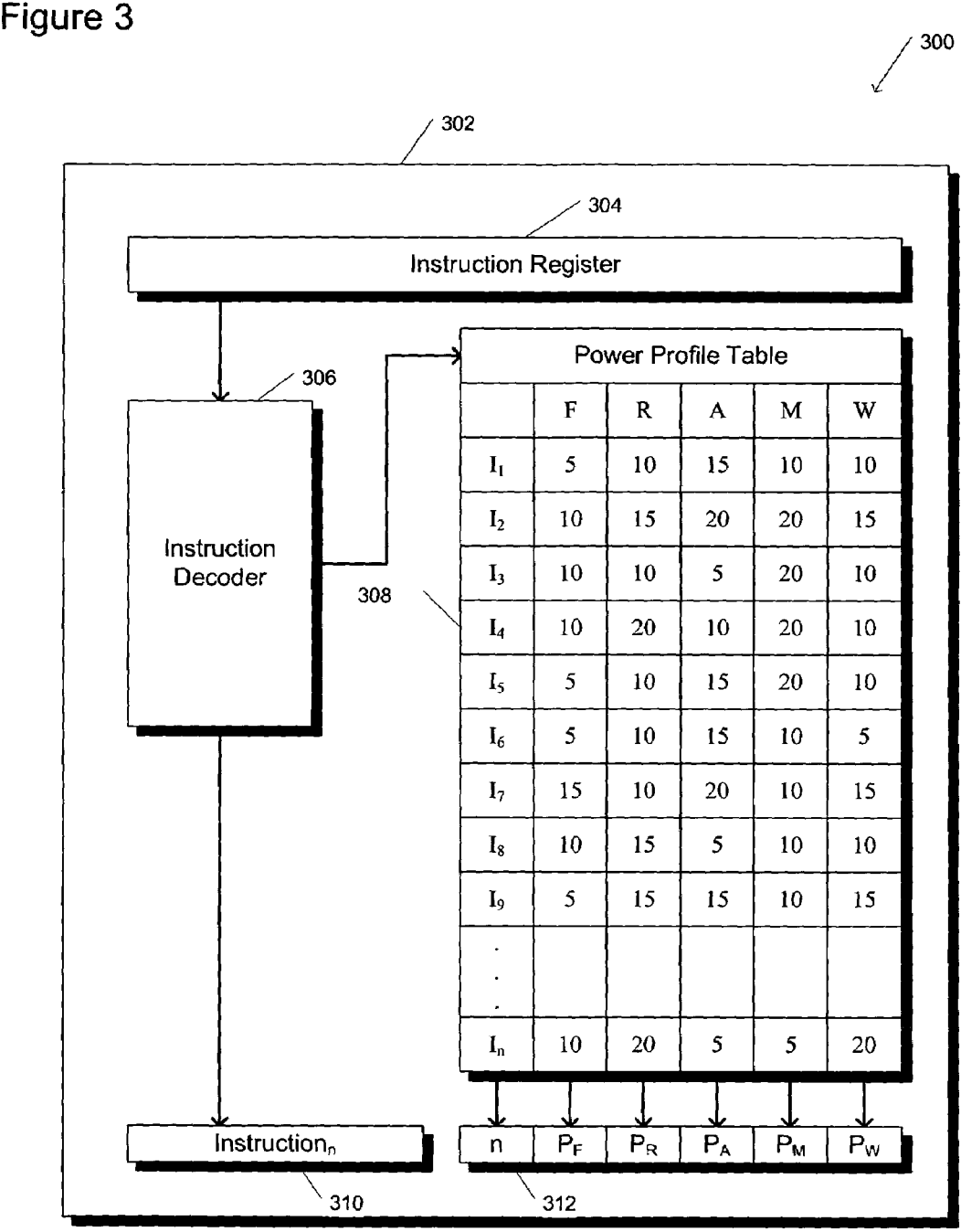
FIG. 3 is a block diagram of a predicted power profile table according to the present invention that predicts power consumption, per pipeline stage.

Referring now to FIG. 3, a diagram 300 is shown of a power profile table 308 within a decoder 302 of a modern microprocessor. More specifically, the decoder 302 includes an instruction register 304 for receiving and temporarily storing instructions from a fetcher. The instruction register 304 is attached to an instruction decoder 306. The decoder 306 decodes the instructions in the register 304, and provides them to an instruction buffer 310.

In addition, as the instruction decoder 306 decodes instructions, it provides a signal to the power profile table 308 indicating the instruction that is being decoded. That is, it indicates either the type of instruction (Load, ALU, JMP, etc.), or alternatively, the actual instruction within the instruction set of the microprocessor, which is being decoded. In one embodiment, the signal acts as an index into the power profile table 308 to select one of n different power profile entries in the table.

Each of the entries in the power profile table 308 contains an estimated power value, corresponding to a particular pipeline stage in the microprocessor. For example, the power profile entry associated with instruction $I_4$ indicates that this instruction has a power value of 10 within the F stage, 20 within the R stage, 10 within the A stage, 20 within the M stage, and 10 within the W stage. As an entry in the power profile table 308 is indexed by the instruction decoder 306, the estimated power values are provided to a power profile register 312. In one embodiment, the power profile register 312 contains temporary storage for each of the power profile values for a particular instruction, along with an instruction indicator to designate which of the instructions the power profile entry 308 is associated with. One skilled in the art will appreciate that the values contained in a power profile entry may be determined heuristically by the manufacturer of a microprocessor prior to final fabrication. In addition, it should be appreciated that the power profile values will vary in different processor designs, and with different technologies used to manufacture processors.

Figure 4:
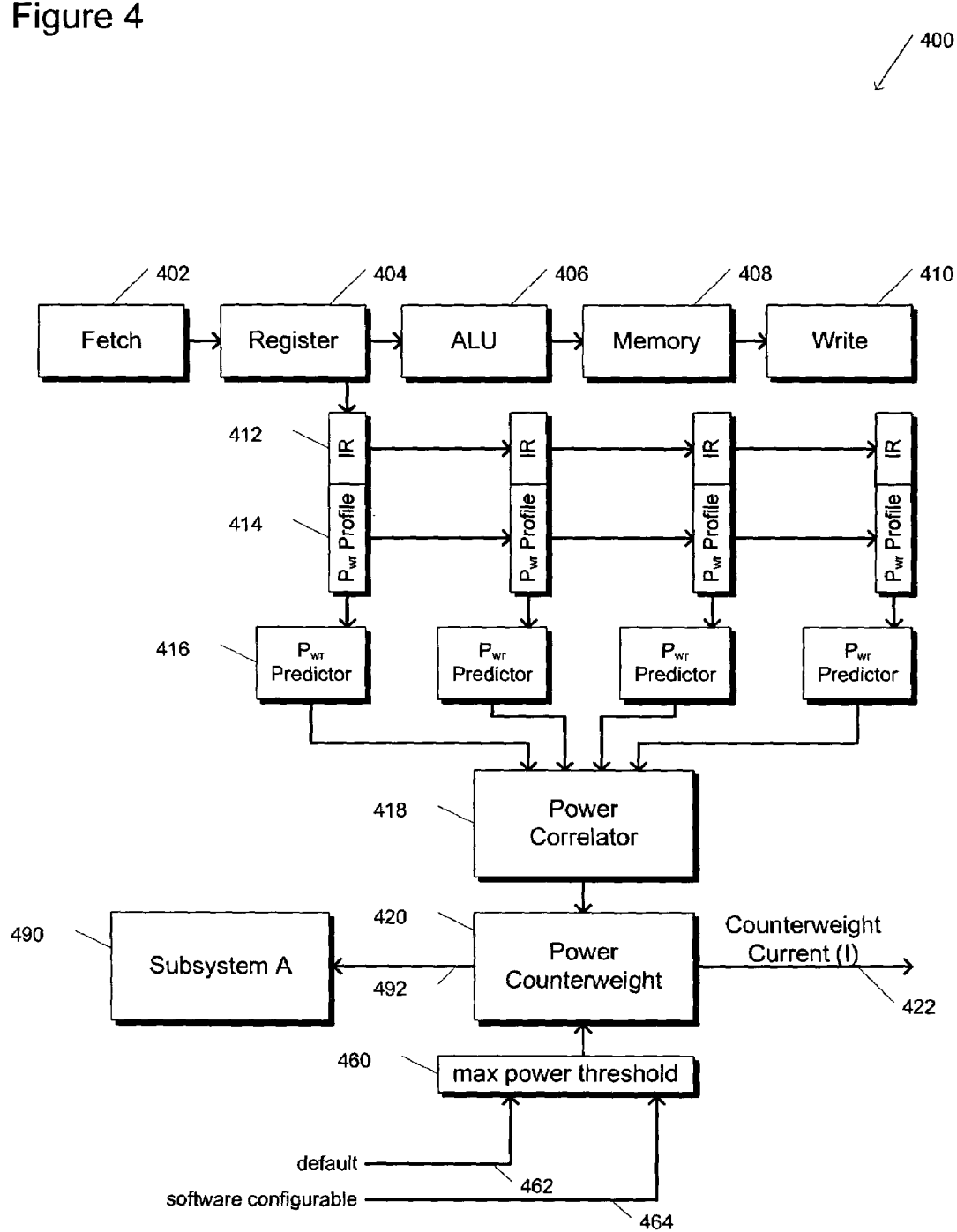
FIG. 4 is a block diagram of the predictive power correlation according to the present invention, within a pipeline microprocessor.

Referring now to FIG. 4, a block diagram of a microprocessor based system 400 is shown illustrating a pipeline microprocessor, similar to that described above with reference to FIG. 2, including however, the novel power counterweight system of the present invention. The microprocessor based system 400 includes a microprocessor having five pipeline stages: Fetch 402, Register 404, ALU 406, Memory 408, and Write 410. In one embodiment, the power profile table 308 as shown in FIG. 3 is contained within the Register stage 404. As an instruction is decoded within the Register stage 404, it is provided to an instruction register 412. In addition, the decoder indexes into the power profile table 308, causing a power profile entry corresponding to the instruction to be stored into a power profile buffer 414. Then, as the instruction proceeds to each stage in the pipeline, the power profile entry associated with the instruction also proceeds down the pipeline, being stored in power profile buffers 414 located in each stage of the pipeline.

Coupled to each of the power profile buffers 414 are power predictors 416. The power predictors 416 extract the particular power profile value within the power profile buffer 414 that is appropriate for its pipeline stage. For example, the predictor 416 in the R stage will extract the R power profile value. The predictor 416 in the A stage will extract the A power profile value, etc.

Thus, for the microprocessor based system 400, at any one time, four distinct power profile values will be extracted by the power predictors 416, corresponding to four distinct instructions executing in the R, A, M and W stages of the pipeline. All of these power profile values are provided to a power correlator 418 for arithmetic combining. In one embodiment, the arithmetic combining is a simple summation of the values. In an alternate embodiment, the arithmetic combining allows predefined weighting to be applied to particular stages and/or allows minimum and maximum thresholds for each of the stages to be met, or substituted, for the values provided by the predictors 416. After the power correlator 418 performs the arithmetic combining, the combined power estimate is provided to a power counterweight 420.

In an alternate embodiment, rather than providing a power profile table 308 within the instruction decoder 302, a portion of the power profile table 308 may be placed within each power predictor 416 that is applicable for the pipeline stage within which the power predictor 416 resides. That is, power profiles for the R stage 404 may be placed within the power predictor 416 associated with the R stage, power profiles for the A stage 406 may be placed within the power predictor 416 associated with the A stage, and so on. Then, as each instruction proceeds thru the pipeline, the power predictor 416 for each pipeline stage indexes into its power profile table 308 and extracts a power profile for the instruction executing in its stage.

The power counterweight 420 receives the combined power estimate from the power correlator 418 and produces a counterweight current 422, the purpose of which is to make the total power consumed by the processor based system 400 to be invariant. That is, given a maximum power consumed by a processor based system 400, whenever the combined power estimate is less than the maximum power, the power counterweight 420 produces a counterweight current 422 that is equal to the maximum power minus the combined power estimate. This can be written as:

Counterweight Current=Max Power−Estimated Power

The maximum power threshold is provided via a maximum power threshold register 460 to the power counterweight 420. The contents of the power threshold register 460 may either be set from a pre-coded default 462, or alternatively, may be established at run-time through software configuration 464.

The power counterweight 420 is also coupled to a subsystem A 490 via an inhibit/burn signal line 492. Thus, as determined by the power counterweight 420, if additional power consumption may be met by turning on (burn) subsystem A 490 within the processor based system 400, the power counterweight indicates such to subsystem A 490 via the inhibit/burn signal line 492. This can be either in place of a counterweight current 422, or in addition to a counterweight current 422. In addition, the power counterweight 420 may also choose to shut down the operation of subsystem A 490, if its functionality is not required during the next clock cycle, by providing an inhibit signal on the inhibit burn signal line 492, thereby reducing the power consumption of the processor based system 400. Such inhibition of subsystem A 490 can be accomplished either in addition to generation of the counterweight current 422, or as an alternative to the counterweight current 422 for the purpose of masking the power consumption of particular instructions that are executing (i.e., systems can be turned off to reduce current consumption in an amount proportional to a predicted value for a current clock cycle or randomly). One skilled in the art should appreciate that the discussion above related to subsystem A is exemplary only. In practice, the processor based system 400 will contain many subsystems (e.g., media processing unit, FPU, I/O circuits, random number generators, DRAM, etc.) that may be turned on even when they are not needed, to increase the power consumption of the processor based system 400, or turned off, to reduce the power consumption of the processor based system 400, as determined by the power counterweight 420. In one embodiment, located within the power counterweight 420 is a table (not shown) containing the on/off power requirements for each of the subsystems within the processor based system 400. Inhibit/burn signal lines 492 are connected to each of the subsystems so that they may be turned on or off as determined by the power counterweight 420. This will be particularly described below with reference to FIGS. 9 and 10.

Figure 5:
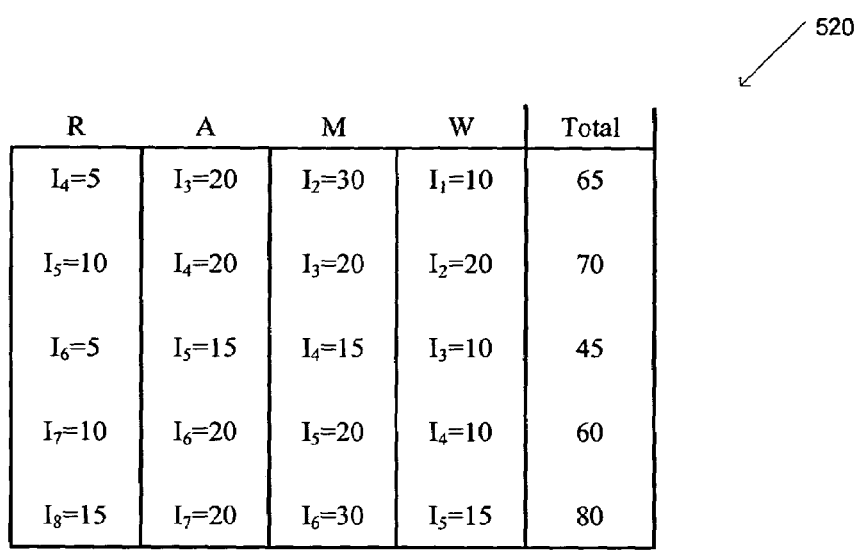
FIG. 5 is a diagram illustrating the power consumption of a pipeline microprocessor incorporating the power prediction and counterweight according to the present invention.
Figure 5:
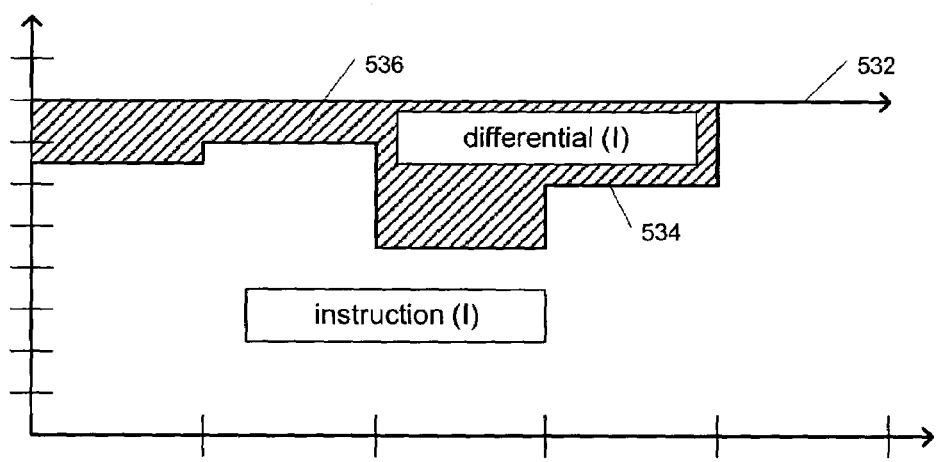

To illustrate the effect the power predictor 418 and power counterweight 420 have on the total power consumed within the processor based system 400, attention is now directed at FIG. 5. FIG. 5 contains a table 520, similar to that shown in FIG. 2, along with a power graph 530 illustrating power consumed by a processor that is executing the instructions in table 520.

More specifically, during clock cycle 1, instructions $I_1$ thru $I_4$ are found within pipeline stages W-R, respectively. Thus, instructions $I_1$ thru $I_4$ have a combined power consumption of 65. This is shown as current (I) line 534. The power predictor 416 of FIG. 4 provides the power estimate values for each of these instructions to the power correlator 418, which in turn, provides an arithmetic sum of these values to the power counterweight 420. The power counterweight 420 then produces a counterweight current 422 of 15 so that a maximum power threshold of 80 is consumed by the processor based system 400.

During clock cycle 2, the power predictors 416 provide the power estimate values for instructions $I_2$ thru $I_5$ to the power correlator 418 to produce a combined power value of 70. This value is provided to the power counterweight 420. The power counterweight 420 therefore provides a counterweight current 422 with a value of 10 so that a maximum power threshold of 80 is consumed by the processor based system 400.

Thus, during clock cycle 2, although the instructions that are executing are different than those executing in clock cycle 1, the total power consumed by the processor based system 400 is the same.

During clock cycle 3, the combined power estimate for instructions $I_3$ thru $I_6$ is 45. This value is provided to the power counterweight 420, to produce a counterweight current 422 of 35. Thus, the maximum power threshold that is consumed by the processor during clock cycle 3 is 80.

During clock cycle 4, the combined power estimate for instructions $I_4$ thru $I_7$ is 60. This value is provided to the power counterweight 420, to produce a counterweight current 422 of 20. Thus, the maximum power threshold that is consumed by the processor during clock cycle 4 is 80.

During clock cycle 5, the combined power estimate for instructions $I_5$ thru $I_8$ is 80. This value is provided to the power counterweight 420, to produce a counterweight current 422 of 0. Thus, the maximum power threshold that is consumed by the processor during clock cycle 5 is 80.

So, in graph 530, although we have different instructions proceeding thru the five pipeline stages during clock cycles 1-5, with different combined power consumption values (shown by line 534), the total power consumed remains at 80 (shown by line 532). This is because the power counterweight 420 produces a differential counterweight current 422, illustrated by shaded area 536.

Figure 6:
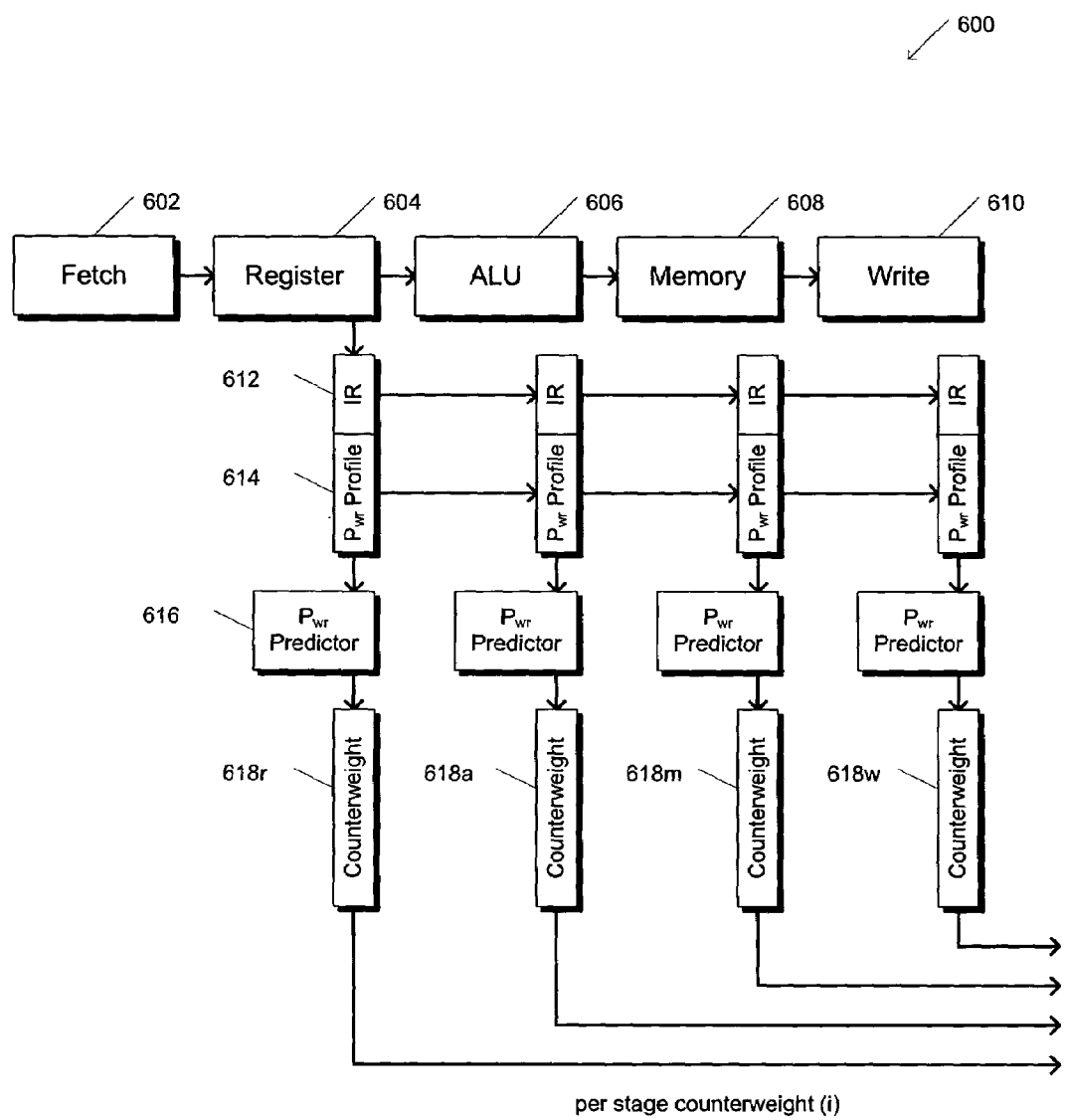
FIG. 6 is a block diagram illustrating per stage power prediction logic within a pipeline processor according to the present invention.

Referring now to FIG. 6, a block diagram is provided of a microprocessor 600, similar to that described above with reference to FIG. 4. However, in this embodiment, rather than providing a power correlator 418 to arithmetically combine power profile values for each of the pipeline stages, a power counterweight 618 is added to each of the stages (r, a, m, and w) to produce distinct counterweight currents for each stage. Thus, the power estimate value is provided from the power predictor 616 in each stage directly to a stage specific power counterweight 618. The resulting maximum power consumed by the processor is identical to that shown in FIG. 5, but without having to arithmetically combine the individual power estimate values.

Figure 7:
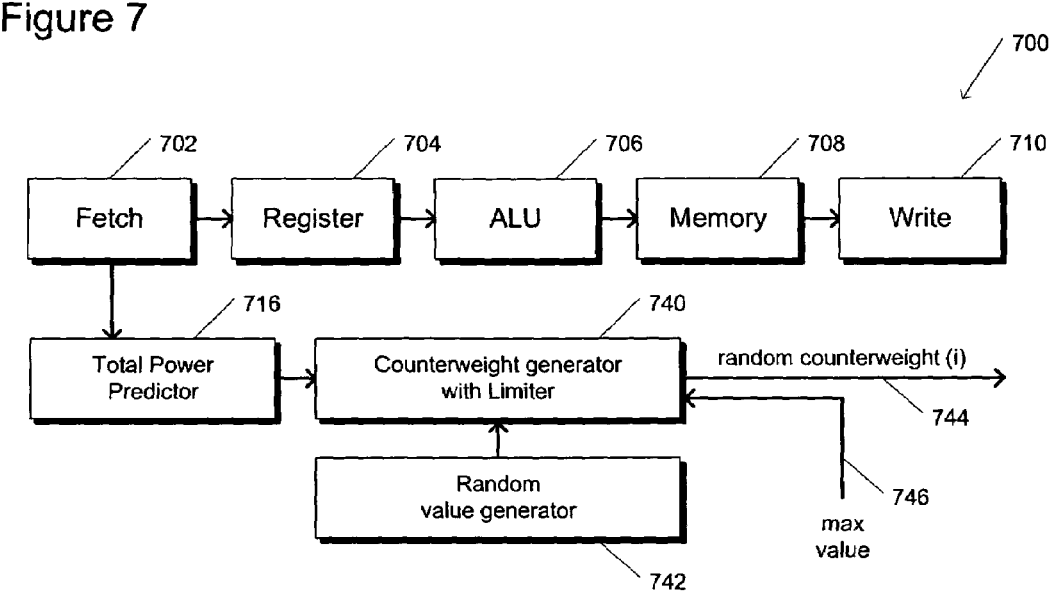
FIG. 7 is a block diagram of a random power counterweight circuit within a pipeline microprocessor according to the present invention.

Referring to FIG. 7, and alternative embodiment of the present invention is shown within a microprocessor 700. One purpose of the invention described above has been to disassociate the power consumed by a microprocessor from the instructions it is executing. The embodiments shown in FIGS. 4 and 6 disassociate the power by adding a counterweight current to obtain a maximum threshold value, thereby making the current drain invariant. In contrast, the embodiment of FIG. 7 disassociates the power consumed by the microprocessor with instructions it is executing by adding a random counterweight current.

The processor 700 includes a fetch stage 702, a register stage 704, an ALU stage 706, a memory stage 708, and a write stage 710. Coupled to the fetch stage 702 (or alternatively the register stage 704) is a total power predictor 716. The total power predictor 716 is used to predict the total power that will be consumed during each clock cycle by instructions in the pipeline stages 704-710, similar to the power predictor 416 of FIG. 4. Although the predictor 716 is not necessary to the embodiment shown in FIG. 7, its prediction can be used to limit the random counterweight current 744 as will be further described below. Coupled to the total power predictor 716 is a counterweight generator 740 for producing a random counterweight 744. The counterweight generator 740 is also connected to a random number generator 742.

Operationally, for each clock cycle of the microprocessor 700, the random number generator 742 provides a random value to the counterweight generator 740. The counterweight generator 740 then generates a random counterweight current 744 that is proportional to the random value provided by the random number generator 742. By adding the random counterweight current 744 to the power already consumed by the executing instructions, the total power consumed by the microprocessor 700 will be disassociated with the instructions it is executing, as will particularly illustrated below with reference to FIG. 8. This has been accomplished without any estimation of the power that will be consumed, and without any coupling of the counterweight generator to the instructions that are executing. However, without the use of the total power predictor 716, it is possible that the power consumed by the microprocessor 700, during a particular clock cycle, may exceed an overall maximum threshold. So, the total power predictor 716 provides an estimate of the total power that will be consumed by the microprocessor 700 to the counterweight generator 740. Within the counterweight generator 740 is a limiter that throttles the random counterweight current 744 to a predefined threshold. That is, whenever the random counterweight current 744, plus the total estimated power that is predicted by the total power predictor 716, exceeds a predefined threshold, the amount of the random counterweight current 744 is limited so that the total power consumed by the microprocessor 700 does not exceed the predefined threshold. One skilled in the art will appreciate that the predefined threshold may be set similar to that described above with reference to FIG. 4, either at time of fabrication, or via software configuration. In addition, the random counterweight current 744 may be added to or subtracted from, a baseline power drain, on top of which the randomness is provided.

Figure 8:
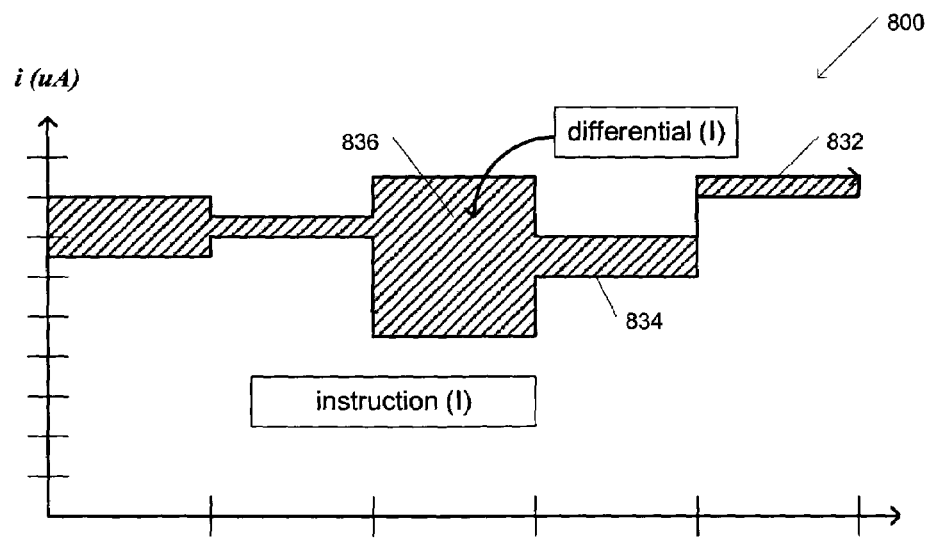
FIG. 8 is a graph illustrating the random power counterweight circuit of FIG. 7.

Referring now to FIG. 8, a graph 800 is shown illustrating the power consumption of the microprocessor 700 utilizing the counterweight generator 740. For ease of illustration, the instructions executing during clock cycles 1-5 are the same as those illustrated in table 520 of FIG. 5.

During the first clock cycle, instructions $I_1$ thru $I_4$ have a power consumption of 65. In addition, the random number generator 742 provides a random value to the counterweight generator 740 to produce a random counterweight current 744 of 15. So, the total power consumed by the microprocessor is 80.

During the second clock cycle, instructions $I_2$ thru $I_5$ have a power consumption of 70 (5 more than in clock cycle 1). In addition, the random number generator 742 provides a random value to the counterweight generator 740 to produce a random counterweight current 744 of 5. So, the total power consumed by the microprocessor is 75. So, during clock cycle 2, even though the total power consumed by instructions $I_2$ thru $I_5$ is greater than the instructions executing during clock cycle 1, the total power consumed by the microprocessor 700 is 5 less than during clock cycle 1.

During the third clock cycle, instructions $I_3$ thru $I_6$ have a power consumption of 45. In addition, the random number generator 742 provides a random value to the counterweight generator 740 to produce a random counterweight current 744 of 40. So, the total power consumed by the microprocessor is 85. So, during clock cycle 3, even though the total power consumed by instructions $I_3$ thru $I_6$ is less than the instructions executing during clock cycles 1 or 2, the total power consumed by the microprocessor 700 is greater than during those clock cycles.

During the fourth clock cycle, instructions $I_4$ thru $I_7$ have a power consumption of 60. In addition, the random number generator 742 provides a random value to the counterweight generator 740 to produce a random counterweight current 744 of 10. So, the total power consumed by the microprocessor is 70.

During the fifth clock cycle, instructions $I_5$ thru $I_8$ have a power consumption of 80. In addition, the random number generator 742 provides a random value to the counterweight generator 740 to produce a random counterweight current 744 of 15. However, in this instance, the counterweight current 744, plus the estimated power consumption of 80, exceeds a maximum power threshold of 85. So, the counterweight generator with limiter 740 limits the random counterweight current 744 to a value of 5, resulting in a total power consumption of 85.

What has been illustrated with respect to FIGS. 3-6 are embodiments of the invention that disassociate power consumption of a processing system with the instructions it is executing by estimating the power that will be consumed during each clock cycle, and by modulating the overall power consumption of a system by various means (adding counterweight currents, enabling/disabling subsystems, etc.) to mask the execution signature of the processing system, regardless of what instructions are in the pipeline. With respect to FIGS. 7-8, an embodiment of the invention is described that disassociates the power consumption of a processing system with the instructions it is executing, by adding a randomized counterweight current to the total power consumed. Thus, whether the total power consumed is made invariant, or is randomized, there is no correlation between the total power consumed and the instructions that are being executed, that may be used by scientist to speculate or determine the instruction flow of a processing system incorporating the present invention.

The above-described embodiments disassociate the instantaneous power drain of the processor, either by randomizing the clock-by-clock power drain, or by maintaining a constant power drain. In most instances, this is performed by adding a counterweight current. It is also desirable, as mentioned above with reference to FIG. 4, to turn on or shut down various subsystems on a microprocessor based system, if possible. By selectively inhibiting power drain from selected subsystems, instantaneous power drain can be disassociated with instruction execution, while reducing the total power drain of the processor based system. This methodology will now be further described with reference to FIGS. 9-10, to which attention is now directed.

Figure 9:
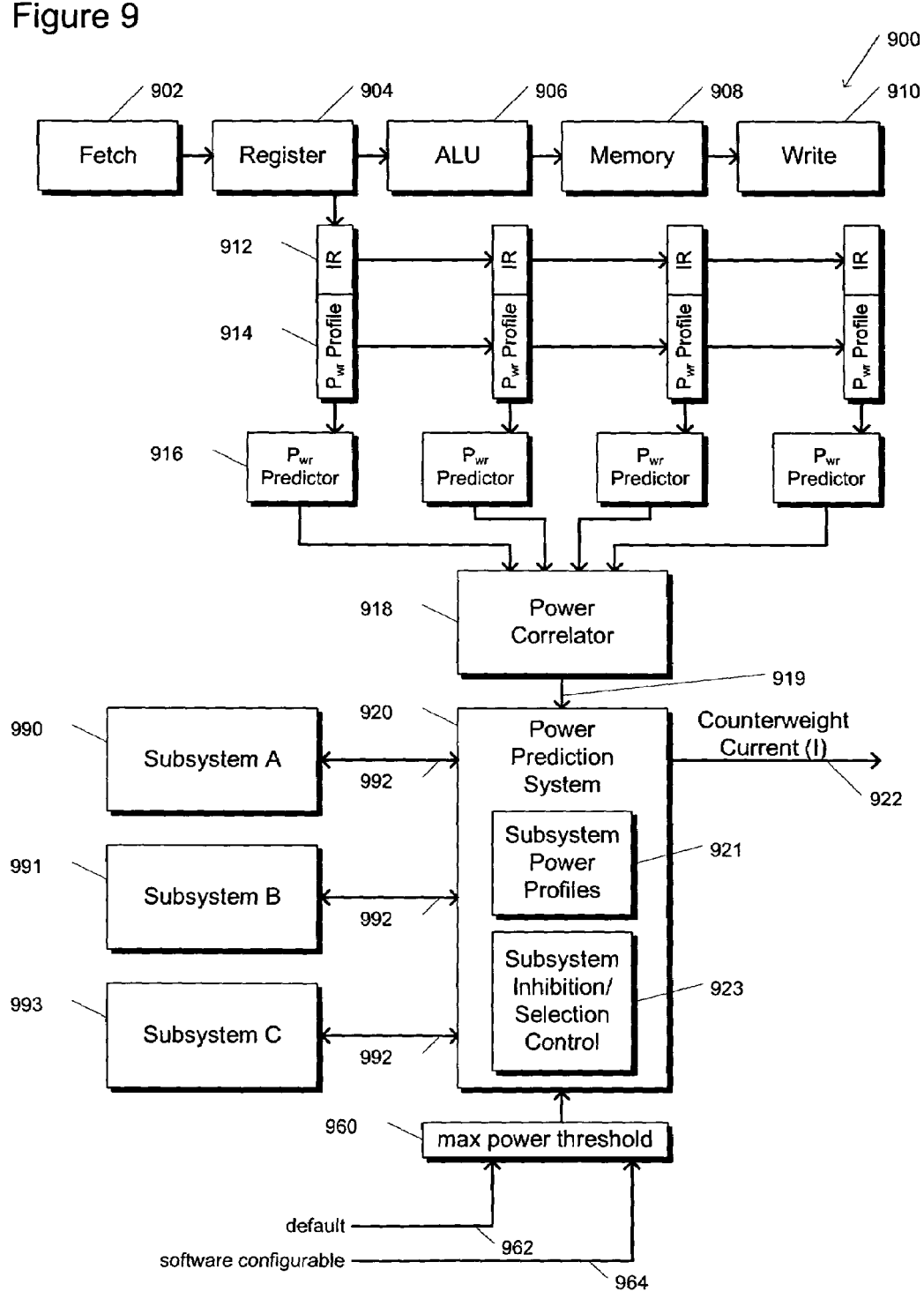
FIG. 9 is a block diagram of a microprocessor incorporating subsystem inhibition control according to the present invention.

Referring to FIG. 9, a microprocessor 900 is shown, similar to the one described above with respect to FIG. 4. Like elements have like references with "9" replacing "4" in the hundreds digit. In addition, three subsystems 990, 991, and 993 identified as subsystems A, B, C are shown. As mentioned above with respect to FIG. 4, these subsystems include FPU's, media processing unit units, or any other subsystem within a microprocessor than can be selectively turned on/off to increase or reduce the power drain of the microprocessor 900. The subsystems 990, 991, 993 are coupled to the power prediction system 920 via inhibit/burn signal lines 992. In FIG. 9, the inhibit/burn signal lines 992 are shown as bi-directional because they are also intended to convey "subsystem available" information from each of the subsystems 991, 991, 991 to the power prediction system 920. That is, if the microprocessor 900 determines that any of its subsystems will not be needed for processing, it will provide an indication to the power prediction system 920, on the signal lines 992, to indicate which, if any, of the subsystems may be inhibited, or powered off. The power prediction system can then choose to inhibit those available subsystems, as will now be further described.

Within the power prediction system 920 are subsystem power profiles 921 and subsystem inhibition/selection control 923. In one embodiment, the subsystem power profiles 921 provide an indication to the power prediction system 920 of the amount of power that each subsystem consumes when it is powered on. The power prediction system 920 utilizes the information contained in the subsystem power profiles 921 to select particular ones of the subsystems 990, 991, 993 to be powered down. The subsystem inhibition/selection control 923 works in conjunction with the power prediction system 920 to select particular ones of the subsystems 990, 991, 993 to be shut down as will now be described with reference to FIG. 10.

Figure 10:
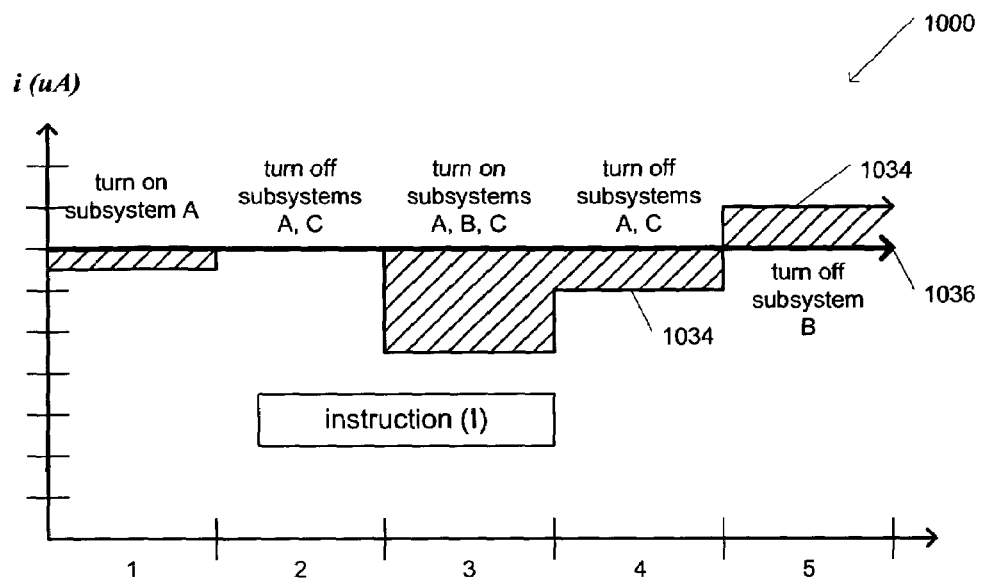
FIG. 10 is a graph illustrating the effect of the subsystem inhibition control on the instantaneous power drain of a microprocessor to maintain a constant power drain according to the present invention.

FIG. 10 provides a graph 1000 that illustrates 5 clock cycles of instruction execution within the microprocessor 900. Two power lines 1034, 1036 are shown. The first power line 1034 illustrates the power drain within the microprocessor 900 during 5 clock cycles, without utilizing the power prediction system 920 of the present invention. The second power line 1036 illustrates the use of the subsystem inhibition/selection control 923, along with the power prediction system 920, to maintain a constant power drain for the microprocessor 900, thereby disassociating the instantaneous power drain from instruction execution.

During a first clock cycle, the power prediction system receives a power predictor 919 from the power correlator 918 and determines that the cumulative power drain in all stages of the microprocessor 900 will be less than a predetermined threshold. Rather than adding a counterweight current, the power prediction system 920 determines which of the subsystems 990, 991, 993 are available to be shut down, via the inhibit/burn signal lines 992, and communicates how much "counterweight" current is needed to maintain a constant power drain. The subsystem inhibition/selection control 923 utilizes the subsystem power profiles 921 to select an available subsystem to shut down. In this instance, subsystem A 990 provides the appropriate counterweight current, and is turned on, via inhibit/burn signal line 992.

During clock cycle 2, the power prediction system 920 determines that the predetermined power drain can be maintained by turning off subsystems A 990 and C 993, and therefore utilizes the subsystem inhibition/selection control 923 to turn off these subsystems.

During clock cycle 3, the power prediction system determines that to maintain a constant power drain, subsystems A 990, B 991, and C 993 must all be turned on, and therefore turns them on via inhibit/burn signal lines 992.

During clock cycle 4, the power prediction system determines that to maintain a constant power drain, subsystems A 990, and C 993 must be turned off, and therefore turns them off via inhibit/burn signal lines 992.

During clock cycle 5, the power prediction system determines that to maintain a constant power drain, subsystem B 991 must be turned off, and therefore turns it off via inhibit/burn signal lines 992.

At this point, one skilled in the art will appreciate that the microprocessor 900 has maintained a constant power drain during clock cycles 1-5 while draining less power than the embodiment described above with respect to FIG. 5. This is because it was possible to inhibit, or turn off, particular subsystems to maintain a constant power drain, rather than adding a differential power, or counterweight current.

Figure 11:
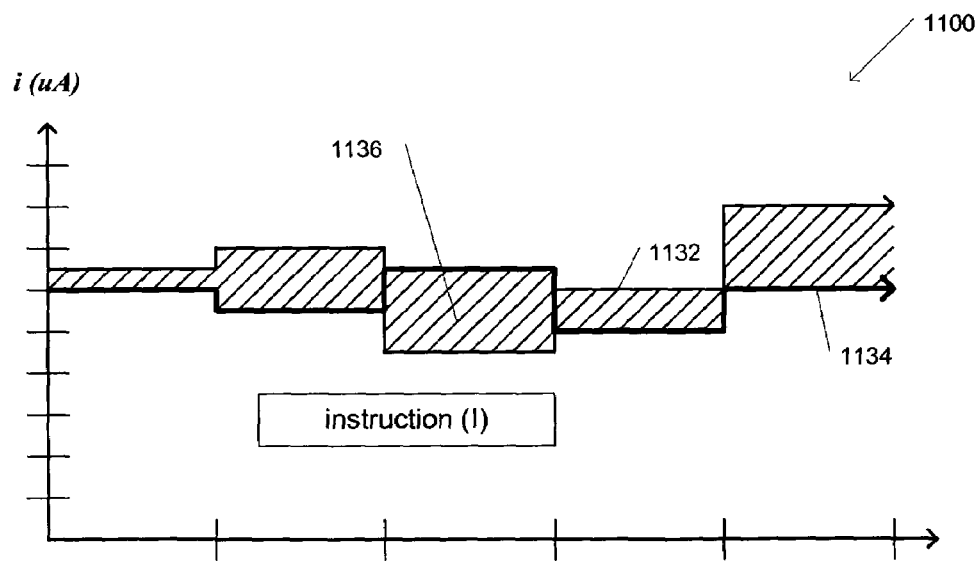
FIG. 11 is a graph illustrating the effect of the subsystem inhibition control on the instantaneous power drain of a microprocessor to provide a random power drain according to the present invention.

Referring now to FIG. 11, a graph 1100 is shown illustrating the use of the subsystem inhibition/selection control 923 of the present invention, in conjunction with the random counterweight circuitry described above with reference to FIGS. 7 and 8, to provide a randomized power drain shown by power line 1134, in response to an actual instruction power drain shown by power line 1132. That is, the random value generator 742 of FIG. 7 provides a randomized desired power value, which in this instance may be positive or negative, to the subsystem inhibition/selection control 923. The inhibition/selection control 923 then turns on or turns off, available subsystems 990, 991, 993 to achieve a total power consumption that is random with respect to instruction execution.

While not specifically described above, one skilled in the art will appreciate that the ability to turn on or off particular subsystems within a microprocessor, to disassociate instantaneous power drain from the actual power required to execute instructions, may be used as described in FIG. 9, or may be combined with the counterweight current embodiment described above with respect to FIG. 4, and/or may be combined with the random counterweight current embodiment described above with respect to FIG. 7. That is, each embodiment has particular benefits, and may be utilized singly, or in combination with the other embodiments to obtain an optimum solution for a particular implementation. If a microprocessor has numerous subsystems that may be turned on/off, and if it is desired to reduce total power consumption to an absolute minimum, then the embodiment described with reference to FIG. 9 may provide the optimum solution. However, if total power consumption is irrelevant, and disassociation of instruction execution with power consumption is the primary concern, then the embodiment described with reference to FIG. 9 may be incorporated along with the counterweight currents of either FIG. 4 and/or FIG. 7.

Although the present invention and its objects, features, and advantages have been described in detail, other embodiments are encompassed by the invention as well. In addition to implementations of the invention using hardware, the invention can be embodied in a computer usable (e.g., readable) medium configured to store a computer readable program code. The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, AHDL (Altera Hardware Description Language) and so on, or other programming and/or circuit (i.e., schematic) capture tools available in the art. The program code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished by the invention as described above can be represented in a core (e.g., a microprocessor core) that is embodied in programming code and may be transformed to hardware as part of the production of integrated circuits. Also, the invention may be embodied as a combination of hardware and software.

In addition, the present invention has been particularly characterized in terms of a CPU or microprocessor. In particular, the embodiments of the present invention described with reference to FIGS. 3-11 portray its application within a 5-stage pipelined CPU based system 400. These specific embodiments and characterizations are presented herein as representative embodiments for the present invention. However, such description should by no means restrict application of the concept to a pipeline microprocessor, much less a 5-stage processor. Rather, the embodiments described that make the total power consumption of a processing system invariant, or random, may be applied to any processing system capable of executing instructions.

Furthermore, the discussion above has not attempted to describe the operation of the invention within the nuances of modern processor instruction flow. That is, one skilled in the art will appreciate that instruction flow within a pipeline microprocessor is often non-sequential, with flow being interrupted by branches, error conditions, etc. In addition, it is common for instruction flow to stall or slip for a number of cycles, either when waiting on following pipeline stages to complete an operation, or when retrieving/storing data from/to memory. Such discussion has been removed so that the reader will more readily understand the invention. However, while not shown, it should be understood that the counterweight current of the present invention, particularly, the power counterweight block 420, shadows the pipeline of the processing system. That is, the counterweight bock 420 is coupled to the interlock control of a processing system, and the power predictor 416 is coupled not only to the decoder, but also to the instruction pointer (and next instruction pointer) so that they may properly estimate and control the counterweight current in relation to the actual instruction flow of a modern processing system, regardless of slips or stalls in processing.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. A security system for a microprocessor based system having multiple subsystems for ensuring that power consumption of the microprocessor based system is not indicative of a plurality of instructions that the microprocessor is executing, the security system comprising:

a power correlator for estimating power that each instruction of the plurality of instructions will consume during its execution; and a subsystem inhibition control, coupled to said power correlator, for utilizing said estimated power, and for selectively turning on/off ones of the multiple subsystems within the microprocessor based system during execution of the instructions, wherein the ones of the multiple subsystems that are turned on/off are selected so as to disassociate total power consumed by the microprocessor based system from the instructions it is executing.

2. A security system for ensuring that power consumption of a microprocessor based system having multiple subsystems is not indicative of instructions that the microprocessor is executing, the security system comprising:

a power correlator for estimating power that the microprocessor based system will consume during execution of instructions; and a subsystem inhibition control, coupled to said power correlator, for utilizing said estimated power, and for selectively turning on/off ones of the multiple subsystems within the microprocessor based system during execution of the instructions, wherein the ones of the multiple subsystems that are turned on/off are selected so as to disassociate total power consumed by the microprocessor based system from the instructions it is executing, and wherein said subsystem inhibition control utilizes said estimated power to determine how much power to add to or subtract from said estimated power, to insure that power consumption of the microprocessor based system is not indicative of the instructions it is executing.

3. The security system of claim 2, wherein power is added to said estimated power by turning on said ones of the multiple subsystems.

4. The security system of claim 2, wherein power is subtracted from said estimated power by turning off said ones of the multiple subsystems.

5. The security system of claim 1, wherein said power correlator estimates power each instruction will consume in each of a plurality of stages within a pipeline of the microprocessor based system.

6. The security system of claim 1, wherein said power correlator comprises a power profile table having a plurality of power profile entries corresponding to a plurality of different instructions, said entries having a plurality of power estimates corresponding to power consumed in a plurality of different pipeline stages within the microprocessor based system.

7. The security system of claim 6, wherein said power correlator further comprises a power profile register, coupled to said power profile table, for temporarily storing one of said power profile entries corresponding to one of said plurality of different instructions.

8. The security system of claim 7, wherein said power profile register provides said one of said power profile entries to said power correlator.

9. The security system of claim 1, wherein said subsystem inhibition control comprises subsystem power profile for indicating to said subsystem inhibition control how much power each of the multiple subsystems consume when turned on.

10. An apparatus, within a processing device having multiple subsystems, for randomizing total power consumed within the processing device, comprising:
   a random value generator for generating a random value as instructions are executed by the processing device; and
   subsystem inhibition control, coupled to said random value generator, for turning on/off selected ones of the multiple subsystems,
   wherein said subsystem inhibition control disassociates said instructions that are executed from total power consumed by the processing device during their execution.

11. The apparatus of claim 10, wherein said random value generator generates said random value between predetermined minimum and predetermined maximum values.

12. The apparatus of claim 10, further comprising:
   a total power predictor, coupled to said subsystem inhibition control, for providing an estimated total power value to said subsystem inhibition control.

13. The apparatus of claim 12, wherein said subsystem inhibition control utilizes said estimated total power value so that the total power consumed by the processing device does not exceed a predetermined threshold.

14. A computer program product for use with a computing device, the computer program product comprising:
   a computer readable storage medium having computer readable program code embodied thereon for causing a processing device having multiple subsystems to be described, said computer readable program code comprising:
      first computer readable program code for providing a power prediction system for providing a predictor of an estimated power that will be consumed by the processing device during execution of each of a plurality of instructions by the processing device; and
      second computer readable program code for providing a subsystem inhibition control, coupled to said power prediction system, for receiving said predictor, and for turning on/off selected ones of the subsystems based on a value of said predictor to disassociate total power consumption of the processing device from the power consumption caused by execution of the plurality of instructions.

15. The computer program product of claim 14, further comprising third computer readable program code for providing a power profile table having a plurality of power consumption entries, said entries corresponding to types of instructions that may be executed by the processing device.

16. The computer program product of claim 14, wherein said subsystem inhibition control comprises:
   selection control, for determining which of the subsystems are available to be turned off; and
   subsystem power profiles, coupled to said selection control, for specifying an estimated power consumption for each of the subsystems.

17. The computer program product of claim 16, wherein said selection control utilizes said estimated power consumption for each of the subsystems to determine which, if any, of the subsystems to turn on/off.

18. The computer program product of claim 14, wherein said subsystem inhibition control turns on/off selected ones of the subsystems to minimize the variation of total power consumption of the processing device, regardless of which instructions are executing on the processing device.

19. The computer program product of claim 14, wherein said subsystem inhibition control turns on/off selected ones of the subsystems to cause the total power consumption of the processing device to be random, regardless of which instructions are executing on the processing device.

20. A method for disassociating power that is consumed by a microprocessor having multiple subsystems from a plurality of instructions that the microprocessor is executing, the method comprising:
   estimating power that will be consumed by each instruction executing in the microprocessor; and
   selectively turning on/off ones of the multiple subsystems in accordance with the estimated power such that the total power consumed by the microprocessor is disassociated from the instructions that are executing.

21. The method of claim 20, wherein said step of turning on/off ones of the multiple subsystems causes the total power consumed by the microprocessor to be invariant.

22. The method of claim 20, wherein said step of turning on/off ones of the multiple subsystems causes the total power consumed by the microprocessor to be random.

23. A method for providing a security system for a microprocessor based system having multiple subsystems, the security system ensuring that power consumption of the microprocessor based system is not indicative of a plurality of instructions that the microprocessor is executing, the method comprising:
   providing a computer readable storage medium having encoded thereon computer-readable program code describing the security system, the computer-readable program code comprising:
      first computer-readable program code for describing a power correlator, the correlator for estimating power that each instruction of the plurality of instructions the microprocessor based system will consume during its execution; and second computer-readable program code for describing a subsystem inhibition control, coupled to the power correlator, for utilizing the estimated power, and for selectively turning on/off ones of the multiple subsystems within the microprocessor based system during execution of the instructions, wherein the ones of the multiple subsystems that are turned on/off are selected so as to disassociate the total power consumed by the microprocessor based system from the instructions it is executing; and transmitting the computer-readable program code as a computer data signal on a network.

24. The method of claim 23, wherein said power correlator comprises a power profile table having a plurality of power profile entries corresponding to a plurality of different instructions, the entries having a plurality of power estimates corresponding to power consumed in a plurality of different pipeline stages within the microprocessor based system.

25. The method of claim 24, wherein said power correlator further comprises a power profile register, coupled to the power profile table, for temporarily storing one of the power profile entries corresponding to one of the plurality of different instructions.

26. A method for providing an apparatus, within a processing device having multiple subsystems, for randomizing the total power consumed within the processing device, the method comprising:

providing a computer readable storage medium having encoded thereon computer-readable program code describing the apparatus, the computer-readable program code comprising:

first computer-readable program code for describing a random value generator for generating a random value as instructions are executed by the processing device; and second computer-readable program code for describing a subsystem inhibition control, coupled to the random value generator, for turning on/off selected ones of the multiple systems, wherein the subsystem inhibition control disassociates the instructions that are executed from total power consumed by the processing device during their execution; and transmitting the computer-readable program code as a computer data signal on a network.

* * * * *